(12) United States Patent
Wang

(10) Patent No.: US 11,295,467 B2
(45) Date of Patent: Apr. 5, 2022

(54) OBJECT DETECTION METHOD, OBJECT DETECTION DEVICE AND STORAGE MEDIUM

(71) Applicant: Goertek Inc., Weifang (CN)

(72) Inventor: Mengmeng Wang, Weifang (CN)

(73) Assignee: GOERTEK INC.

( * ) Notice: Subject to any disclaimer, the term of this patent is extended or adjusted under 35 U.S.C. 154(b) by 0 days.

(21) Appl. No.: 16/629,215

(22) PCT Filed: Aug. 13, 2019

(86) PCT No.: PCT/CN2019/100303
§ 371 (c)(1),
(2) Date: Jan. 7, 2020

(87) PCT Pub. No.: WO2020/134109
PCT Pub. Date: Jul. 2, 2020

(65) Prior Publication Data
US 2021/0312651 A1 Oct. 7, 2021

(30) Foreign Application Priority Data
Dec. 28, 2018 (CN) .......................... 201811628139.5

(51) Int. Cl.
*G06K 9/00* (2022.01)
*G06K 9/48* (2006.01)
(Continued)

(52) U.S. Cl.
CPC ................ *G06T 7/62* (2017.01); *G06T 5/002* (2013.01); *G06T 7/13* (2017.01); *G06T 7/136* (2017.01); *G06V 10/44* (2022.01)

(58) Field of Classification Search
None
See application file for complete search history.

(56) References Cited

U.S. PATENT DOCUMENTS

2004/0181361 A1 9/2004 Ikeda et al.
2006/0285732 A1* 12/2006 Horn ..................... G06T 3/4038
382/128
(Continued)

FOREIGN PATENT DOCUMENTS

CN 101477692 A 7/2009
CN 101567048 A 10/2009
(Continued)

OTHER PUBLICATIONS

English translation of Office Action that issued for corresponding Chinese application No. 201811628139.5; dated Sep. 18, 2013.
(Continued)

*Primary Examiner* — Randolph I Chu
(74) *Attorney, Agent, or Firm* — Clark Hill PLC; James R. Foley

(57) ABSTRACT

The present disclosure provides an object detection method, an object detection device, and a storage medium. In the present disclosure, with respect to each contour existing in an image to be detected, a contour diameter is calculated; a shape of the contour is determined based on side lengths of the circumscribed rectangular frame of each contour and the contour diameter; and an object in the image to be detected and parameter information of the object is determined based on the shape of each contour, thereby quickly and accurately detecting the shape of the object and reducing the labor cost and time of detection due to the low complexity of the detection.

20 Claims, 2 Drawing Sheets

(51) Int. Cl.
*G06V 10/44* (2022.01)
*G06T 7/62* (2017.01)
*G06T 7/136* (2017.01)
*G06T 7/13* (2017.01)
*G06T 5/00* (2006.01)

(56) References Cited

U.S. PATENT DOCUMENTS

| | | |
|---|---|---|
| 2009/0263025 A1 | 10/2009 | Li et al. |
| 2010/0208988 A1 | 8/2010 | Zhou |
| 2013/0050237 A1* | 2/2013 | Kira .................. G06F 16/58 345/589 |
| 2019/0353909 A1* | 11/2019 | Yin .................. G02B 27/0172 |
| 2019/0354742 A1* | 11/2019 | Murakoshi .............. G06T 7/90 |

FOREIGN PATENT DOCUMENTS

| | | | |
|---|---|---|---|
| CN | 101699217 A | 4/2010 | |
| CN | 103150730 A | 6/2013 | |
| CN | 106709909 A | 5/2017 | |
| CN | 106780599 A | 5/2017 | |
| CN | 106952307 * | 7/2017 | ............... G06T 7/60 |
| CN | 106952307 A | 7/2017 | |
| CN | 108109154 A | 6/2018 | |
| CN | 108596232 A | 9/2018 | |
| CN | 108734054 A | 11/2018 | |
| CN | 109003258 A | 12/2018 | |
| CN | 109816675 A | 5/2019 | |
| JP | 6343648 B2 | 6/2018 | |
| JP | 2018088206 A | 6/2018 | |

OTHER PUBLICATIONS

Study of Three Concentric Circle Detection Algorithms Based on the Hough Transform; May 21, 2016.
Research on Automatic Target-scoring System Based on Image Processing Technology.

* cited by examiner

OBJECT DETECTION METHOD, OBJECT DETECTION DEVICE AND STORAGE MEDIUM

CROSS REFERENCE TO RELATED APPLICATIONS

This application is a U.S. National Stage entry under 35 U.S.C. § 371 based on International Application No. PCT/CN2019/100303, filed on Aug. 13, 2019, which claims priority to Chinese Patent Application No. 201811628139.5, filed on Dec. 28, 2018. The embodiment of the priority applications are hereby incorporated herein in their entirety by reference.

TECHNICAL FIELD

The present disclosure relates to the technical field of image processing, and in particular, to an object detection method, an object detection device, and a storage medium.

BACKGROUND

In image detection, geometric shape is one of main features of the image. Especially the circular shape, as a common geometric shape, is an effective component of complex shapes. Ring-shaped objects composed of circular shapes are also extensively used in our daily lives and industrial production. In order to facilitate our daily life and industrial production by achieving intelligent production and saving labor, it is important to accurately detect and identify ring-shaped objects. However, algorithms for ring-shaped object detection are relatively few, among which the ring detection method based on Hough transform is the mainstream, but such an algorithm has the problems of large amount of calculation, low detection efficiency and possibility of false detection.

SUMMARY

The present disclosure provides an object detection method, an object detection device, and a storage medium for accurately and efficiently detecting ring-shaped objects.

The present disclosure provides an object detection method, comprising:

performing edge detection on an image to be detected, and determining at least one contour existing in the image to be detected;

with respect to each contour, acquiring a circumscribed rectangular frame of the contour;

calculating a contour diameter of an enclosed area enclosed by the contour;

determining a shape of the contour based on side lengths of the circumscribed rectangular frame and the contour diameter; and determining an object in the image to be detected and parameter information of the object based on the shape of each contour.

The present disclosure further provides an object detection device, comprising:

a memory for storing a computer program; and
a processor for executing the computer program;
wherein the processor is for
performing edge detection on an image to be detected, and determining at least one contour existing in the image to be detected;

with respect to each contour, acquiring a circumscribed rectangular frame of the contour;

calculating a contour diameter of an enclosed area enclosed by the contour;

determining a shape of the contour based on side lengths of the circumscribed rectangular frame and the contour diameter; and determining an object in the image to be detected and parameter information of the object based on the shape of each contour.

The present disclosure still further provides a computer readable storage medium storing a computer program, and when executed by one or more processors, the computer program causes the one or more processors to implement the steps in the object detection method above.

In the present disclosure, with respect to each contour existing in an image to be detected, a contour diameter is calculated; a shape of the contour is determined based on side lengths of the circumscribed rectangular frame of each contour and the contour diameter; and an object in the image to be detected and parameter information of the object is determined based on the shape of each contour, thereby quickly and accurately detecting the shape of the object and reducing the labor cost and time of detection due to the low complexity of the detection.

BRIEF DESCRIPTION OF DRAWINGS

The drawings described herein are intended to provide a further understanding of the present disclosure, and constitute a part of the present disclosure. The exemplary embodiments of the present disclosure and the explanation thereof are intended to explain rather than limit the present disclosure in any improper way. In the drawing.

DETAILED DESCRIPTION

In order to make the objects, technical solutions and advantages of the present disclosure clearer, the present disclosure will be further described in detail with reference to the accompanying drawings and specific embodiments. Apparently, the embodiments described are merely some but not all of embodiments of the present disclosure. All other embodiments obtained by those skilled in the art based on the embodiments of the present disclosure without paying any creative efforts shall fall within the protection scope of the present disclosure.

The principle of detecting a circle by the Hough transform is as follows. The edge detection is performed on the input image to obtain a boundary point. Since the equation of a circle is $(a-x)^2 (b-y) 2=r^2$, a point on the circular boundary in the x-y coordinate system corresponds to a circle in the a-b coordinate system. Thus, corresponding to many points on a circular boundary in the x-y coordinate system, there are many circles in the a-b coordinate system. Since these points in the original image are all on the same circle, a, b must also satisfy the equation of all circles in the a-b coordinate system after the transform. In the intuitive representation, the circles corresponding to these points will intersect at one point, and the intersection point may be the center of the circle (a, b). The number of circles at the local intersection point is counted, and the maximum value of the number of circles at each local intersection is obtained, and the coordinates (a, b) of the center of the circle corresponding to the original image can be obtained. Once a circle is detected at a certain radius r, the value of the radius r is determined accordingly. However, detecting a circle by the Hough transform has the problems such as large calculation amount, low detection efficiency, and possibility of false detection.

In some embodiments of t the present disclosure, with respect to each contour existing in an image to be detected, a contour diameter is calculated; a shape of the contour is determined based on side lengths of the circumscribed rectangular frame of each contour and the contour diameter; and an object in the image to be detected and parameter information of the object is determined based on the shape of each contour, thereby quickly and accurately detecting the shape of the object and reducing the labor cost and time of detection due to the low complexity of the detection.

The process is described in detail below in conjunction with the method embodiments.

Figure 1:
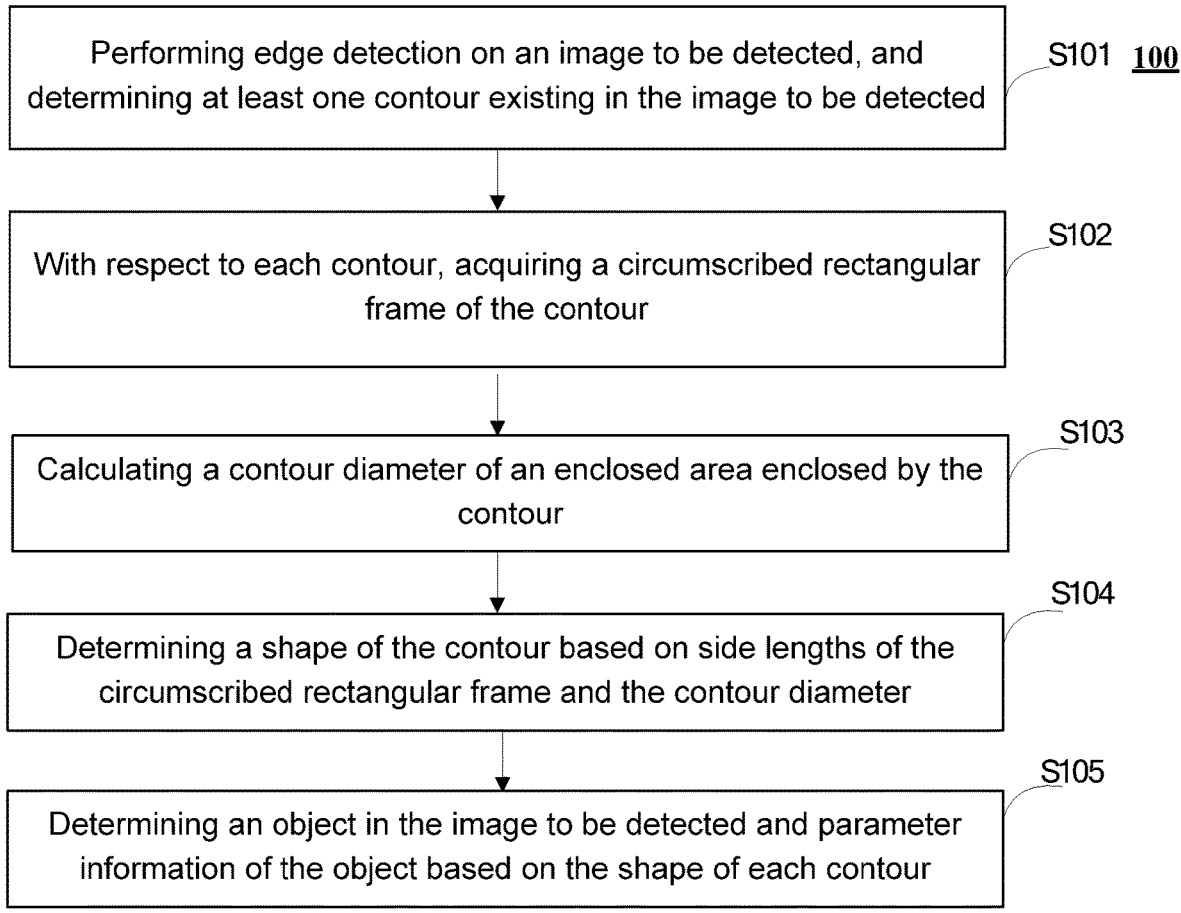
FIG. 1 is a schematic flow chart of an object detection method according to an exemplary embodiment of the present disclosure.

FIG. 1 is a schematic flow chart of an object detection method according to an exemplary embodiment of the present disclosure. As shown in FIG. 1, the method 100 according to the present embodiment comprises the following steps:

S101: performing edge detection on an image to be detected, and determining at least one contour existing in the image to be detected;

S102: with respect to each contour, acquiring a circumscribed rectangular frame of the contour;

S103: calculating a contour diameter of an enclosed area enclosed by the contour;

S104: determining a shape of the contour based on side lengths of the circumscribed rectangular frame and the contour diameter; and S105: determining an object in the image to be detected and parameter information of the object based on the shape of each contour.

The above steps will be explained in details as follows.

S101: performing edge detection on an image to be detected, and determining at least one contour existing in the image to be detected.

The edge detection is used to identify a point in the image where the brightness changes significantly, thereby determining the contour of each object in the image. Edge detection may be done by an edge detection algorithm, such as the Canny edge detection algorithm.

In some examples, determining at least one contour existing in the image to be detected comprises: determining that at least a first contour and a second contour exist in the image to be detected.

After the edge detection, the contour of the image to be detected may be determined by findContours (input_image, contours), which is an image contour finding function, in OpenCV library, which is an image processing library, where input_image represents the input image which will be automatically converted to a binary image after being loaded; contours represents the output, i.e., the detected contour. Every contour is stored in the form of a point vector, i.e., represented by a vector of point type.

It should be understood that when the target object includes a circle, there may be only one contour of the target object.

In the present embodiment, when the target object is a concentric circle and/or a concentric ring, the target object has at least two contours. For example, for the concentric ring, there may be an outer contour and an inner contour, but it needs further judgment as to whether the detected contour is an outer contour or an inner contour.

In some examples, before performing edge detection on the image to be detected, the method further comprises: collecting a first image of the object to be detected; performing grayscale processing on the first image; and performing Gaussian blur on the first image after grayscale processing to obtain a binarized image to be detected.

The grayscale processing refers to, with respect to an image that includes luminance information but does not include color information, since the change of the luminance is continuous, the luminance values must be quantized in order to represent the grayscale image. The luminance values are divided into 0 to 255 levels, 256 levels in total, with 0 indicating pure black and 255 indicating pure white. The grayscale processing may be done by image processing software or a grayscale algorithm. The amount of calculation can be reduced by performing grayscale processing on an image.

Gaussian blur (also known as Gaussian smoothing) refers to adjusting the color values of each pixel in an image according to a Gaussian curve to achieve the purpose of blurring the image. Gaussian blur can be done by image processing software or a Gaussian blur algorithm. The purpose of Gaussian blur is to reduce image noise and reduce redundant information such as details.

Figure 3:
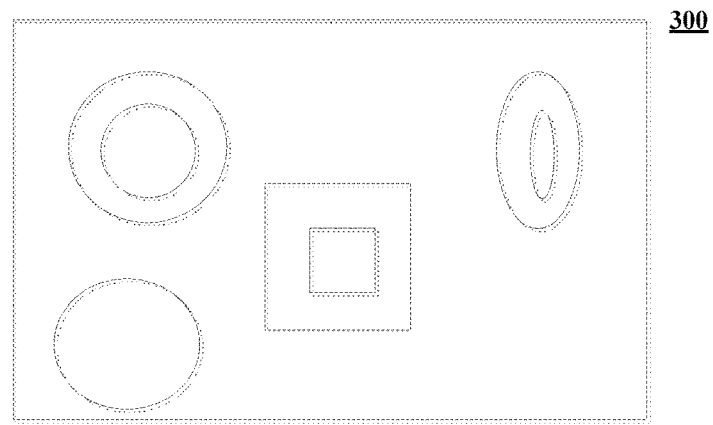
FIG. 3 is a schematic diagram of a contour in an image to be detected according to an exemplary embodiment of the present disclosure.

For example, the terminal device may obtain an original image from the specified path, and perform grayscale processing on the original image by a grayscale algorithm to obtain an image after grayscale processing; perform Gaussian blur on the image after grayscale processing by a Gaussian blur algorithm to obtain an image to be detected which has been binarized and Gaussian blur processed. The Canny edge detection algorithm is used to obtain the edge corresponding to the multiple objects in the image to be detected, thereby further assisting the findContours function to find the contour corresponding to each object in the image to be detected. Each object corresponds to at least one contour. As shown in FIG. 3, the image to be detected 300 includes contours of a plurality of objects. For the concentric ring and/or concentric circle objects to be detected, at least two contours, i.e., an inner contour and an outer contour, may be detected as the first contour and the second contour. As to which one of the first contour and the second contour is an inner contour or an outer contour, it is not limited herein.

S102: with respect to each contour, acquiring a circumscribed rectangular frame of the contour.

In some examples, acquiring a circumscribed rectangular frame of the contour comprises: with respect to any contour of the at least one contour, determining a vertical boundary of the contour based on boundary pixel points of the contour, and determining a circumscribed rectangular frame of the contour according to the vertical boundary.

Figure 4:
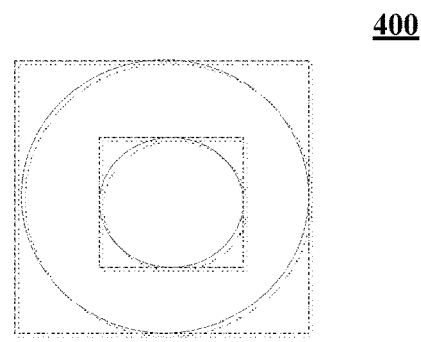
FIG. 4 is a schematic diagram of a circumscribed rectangular frame according to an exemplary embodiment of the present disclosure.

It can be realized by an algorithm of acquiring the circumscribed rectangle box, for example, the function boudingRect( ) for calculating the circumscribed rectangle of the contour in the OpenCV library. The function boudingRect( ) calculates the minimum vertical rectangle which encloses all the points on the contour. Assuming the contour is circular, its circumscribed rectangle is the smallest rectangle that completely encloses all the points on the circular contour. As shown in FIG. 4, there are two circumscribed rectangles of the contours in the concentric ring (as shown by the dotted lines). This function determines the vertical boundary of the contour based on the boundary pixel points of the contour, and determines the circumscribed rectangular box of the contour according to the vertical boundary.

S103: calculating a contour diameter of an enclosed area enclosed by the contour.

Figure 2:
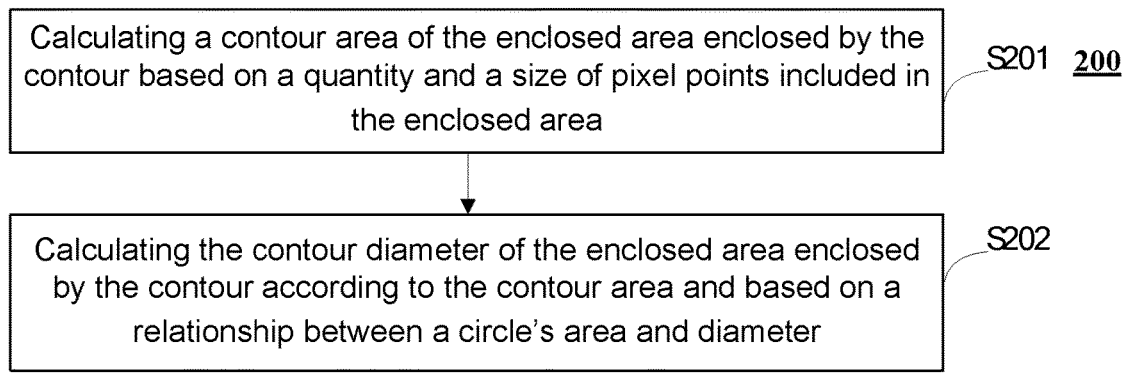
FIG. 2 is a schematic flow chart of a contour diameter according to an exemplary embodiment of the present disclosure.

In some examples, as shown in FIG. 2, calculating a contour diameter of an enclosed area enclosed by the contour comprises:

S201: calculating a contour area of the enclosed area enclosed by the contour based on the quantity and size of pixel points included in the enclosed area; and S202: calculating the contour diameter of the enclosed area enclosed by the contour according to the contour area and based on a relationship between a circle's area and diameter.

The quantity of pixel points and the area of the pixel point in the contour may be determined, and the contour area of the enclosed area enclosed by the contour may be determined according to the number of the pixel points and the area of the pixel point. Alternatively, the contour area may be calculated by the function contourArea(contours[i]) in the OpenCV library, where contours[i] is the input ith contour, and the output is the calculated area value.

Assume all the contours to be circles, and calculate the diameters by the relationship between the area and the diameter of a circle respectively. The calculation formula 1) is:

$$D_i = 2\sqrt{S_i/\pi} \qquad 1)$$

where $S_i$ is the area of the enclosed area enclosed by the i-th contour, and $D_i$ is the diameter of the enclosed area enclosed by the i-th contour.

It should be noted that the enclosed area may be of any shape, but herein the diameter $D_i$ is calculated by assuming that all enclosed areas enclosed by the contours are circular. In other words, regardless of the shape of the enclosed area, the diameter $D_i$ is calculated by assuming that the shape is circular. Thus its area and diameter must satisfy $S=\pi \times d \times d/4$. As to whether the enclosed areas enclosed by the contours are really circular or not, it will be further verified subsequently.

S104: determining a shape of the contour based on side lengths of the circumscribed rectangular frame and the contour diameter.

In some examples, determining a shape of the contour based on side lengths of the circumscribed rectangular frame and the contour diameter comprises: judging whether a first length difference between adjacent side lengths of the circumscribed rectangular frame of the contour is within a first threshold and whether a second length difference between the contour diameter and the side length of the circumscribed rectangular frame corresponding to the contour is within a second threshold, and if the judgment results are both positive, determining that the shape of the contour is a circle.

If the circumscribed rectangle of a contour is a square, that is, the width and height of the rectangle are equal or their ratio is approximately 1, and the contour diameter is equal to or approximately equal to the side length of the circumscribed rectangle, the contour is determined to be circular. The judging formula 2) is:

$$\begin{cases} l_0' < Lh_i / Lw_i < l_1' \\ l_0 <= D_i / Lw_i <= l_1 \end{cases} \qquad 2)$$

where $Lw_i$ is the width of the circumscribed rectangle of the i-th contour, and $Lh_i$ is the height (or length) of the circumscribed rectangle of the i-th contour. In the formula of the width-height ratio of the circumscribed rectangle, $I_0'$ is the minimum threshold and has a value between (0.98, 0.99), $I_1'$ is the set maximum threshold and has a value between (1.0, 1.02). In the formula of diameter-side length ratio, $I_0$ is the set minimum threshold and has a value between (0.965, 0.98), $I_1$ is the set maximum threshold and has a value between (1.01, 1.09). The first length difference may be $Lh_i/Lw_i$, the first threshold may be a range between $I_0'$ and $I_1'$ the second length difference may be $D_i/Lw_i$, and the second threshold may be a range between $I_0$ and $I_1$.

In some examples, the method 100 further comprises: removing a contour having a contour diameter less than a sixth threshold from the at least one contour; and/or removing a contour having a non-circular contour shape from the at least one contour.

If the shape of a contour not satisfying formula 2) is not circular, the contour is removed. At the same time, too small areas will not be considered. In other words, the contour diameter must be greater than 30 pixels, i.e., $D_i \geq 30$. It is in order to remove small area noise that the contours of small areas having a contour diameter less than 30 pixels are removed.

S105: determining an object in the image to be detected and parameter information of the object based on the shape of each contour.

In some examples, the method 100 further comprises: acquiring a position of a first centroid of the first contour and a position of a second centroid of the second contour; and determining an object in the image to be detected and parameter information of the object based on the position of the first centroid, the position of the second centroid and a contour diameter corresponding to each contour.

It should be understood that the position of a centroid refers to the coordinate position of the pixel of the centroid in the image coordinate system, and the pixel points in the image all have their own coordinate positions.

In some examples, the method 100 further comprises: with respect to any contour of the at least one contour, determining a contour moment of the contour; and determining the centroid of the contour according to the contour moment of the contour.

The Image Moments algorithm in the OpenCV library can be used to calculate the centroid of the contour. In this algorithm, the centroid of the contour is mc[i]=Point2d(mu[i].m10/mu[i].m00,mu[i].m01/mu[i].m00), the contour moment of the i-th contour is mu[i]=moments(contours[i]), where contours[i] is the input i-th contour, M00, M01, and M10 are the lower order moments of $M_{pq}$, $M_{pq}$ is the p+q order geometric moment of a digital image f(x, y) of L (length)×W (width), f (x, y) are the gray values of the image at the coordinate point (x, y), and p and q are lower orders.

In some examples, when a difference between the position of the first centroid and the position of the second centroid is less than a third threshold and a difference between a radius of the first contour and a radius of the second contour is greater than a fourth threshold, determining that the object in the image to be detected and parameter information of the object include a concentric ring; when a difference between the position of the first centroid and the position of the second centroid is less than a third threshold and a difference between a radius of the first contour and a radius of the second contour is less than a fifth threshold, determining that the object in the image to be detected and parameter information of the object include a concentric circle.

If the centroid positions of two circles coincide or their difference is within the third threshold and their radius difference is greater than the fourth threshold, it is determined to be a concentric ring. The concentric ring judgment formula 3) is:

$$\begin{cases} |mc_i \cdot x - mc_j \cdot x| <= t_1 \\ |mc_i \cdot y - mc_j \cdot y| <= t_2 \\ |r_i - r_j| > t_r \end{cases} \quad 3)$$

where $mc_i.x$ is the x-coordinate of the position of the centroid (first centroid or second centroid) of the i-th contour (first contour or second contour) of the circular contour, and $mc_i.y$ is the y-coordinate of the position of the centroid; $mc_1.x$ is the x-coordinate of the position of the centroid (first centroid or second centroid) of the j-th contour (first contour or second contour) of the circular contour, and $mc_1.y$ is the y-coordinate of the position of the centroid; $t_1$ is the threshold of the difference of set x-coordinates (the x-coordinate of the third threshold), $t_2$ is the threshold of the difference of set y-coordinates (the y-coordinate of the third threshold), and both of $t_1$ and $t_2$ have a small value and may have the same value; $r_i$ is the radius of the i-th contour area, $r_j$ is the radius of the j-th contour area, $t_r$ is the threshold of the difference of radii (fourth threshold), and $t_r$ is a positive number greater than 5 and may be set according to the actual image size.

It should be understood that the i-th contour and the j-th contour are two different contours. If the i-th contour is the first contour corresponding to the first centroid, the j-th contour is the second contour corresponding to the second centroid. If the i-th contour is the second contour corresponding to the second centroid, the j-th contour is the first contour corresponding to the first centroid.

If the centroid positions of the two circles coincide or their difference is within a certain threshold and the radius difference is less than the fifth threshold (such as 0-3), it is determined to be a concentric circle. The concentric circle judgment formula 4) is:

$$\begin{cases} |mc_i \cdot x - mc_j \cdot x| <= t_1 \\ |mc_i \cdot y - mc_j \cdot y| <= t_2 \\ 0 \le |r_i - r_j| < t'_r \end{cases} \quad 4)$$

The parameters in formula 4) are the same as those in formula 3) and will not be repeated here. $t_r'$ is the fifth threshold. If no concentric circle or concentric ring is found, the process ends. If a concentric circle or a concentric ring is found, the concentric circle or concentric ring is taken as the object in the image to be detected and the object parameter information (the shape of the concentric circle and the concentric ring is taken as the object parameter information).

In some examples, the method 100 further comprises: calculating an average value of the position of the first centroid and the position of the second centroid of the concentric ring to obtain a center of the concentric ring; and calculating a first contour radius of the concentric ring according to a distance between a pixel point on the first contour of the concentric ring and the center of the concentric ring, and calculating a second contour radius of the concentric ring according to a distance between a pixel point on the second contour of the concentric ring and the center of the concentric ring;

and/or calculating an average value of the position of the first centroid and the position of the second centroid of the concentric circle to obtain a center of the concentric circle; and calculating a contour radius of the concentric circle according to distances between pixel points on the first contour and the second contour of the concentric circle and the center of the concentric circle.

In some examples, calculating a first contour radius of the concentric ring according to a distance between a pixel point on the first contour of the concentric ring and the center of the concentric ring, and calculating a second contour radius of the concentric ring according to a distance between a pixel point on the second contour of the concentric ring and the center of the concentric ring comprises:

taking an average value of distances between a plurality of pixel points on the first contour and the center of the concentric ring as the first contour radius of the concentric ring; and taking an average value of distances between a plurality of pixel points on the second contour and the center of the concentric ring as the second contour radius of the concentric ring;

Calculating a contour radius of the concentric circle according to distances between pixel points on the first contour and the second contour of the concentric circle and the center of the concentric circle comprises:

taking an average value of distances between a plurality of pixel points on the first contour and the second contour of the concentric circle and the center of the concentric circle as the contour radius of the concentric circle.

The center of a concentric circle or a concentric ring can be obtained by averaging the positions of the centers of the inner and outer circles. The position of the center of the circle is approximately substituted by the centroid position. The calculating formula 5) is:

$$\begin{cases} C_t \cdot x = 1/2(mc_i \cdot x + mc_j \cdot x) \\ C_t \cdot y = 1/2(mc_i \cdot y + mc_j \cdot y) \end{cases} \quad 5)$$

where $C_t.x$ is the x-coordinate of the center of the t-th concentric circle or concentric ring, $C_t.y$ is the y-coordinate of the center of the concentric circle or concentric ring, $mc_i.x$ is the x-coordinate of the position of the centroid (first centroid or second centroid) of the i-th contour (first contour or second contour) of the circular contour, and $mc_i.y$ is the y-coordinate of the position of the centroid; $mc_1.x$ is the x-coordinate of the position of the centroid (first centroid or second centroid) of the j-th contour (first contour or second contour) of the circular contour, and $mc_1.y$ is the y-coordinate of the position of the centroid of this contour.

On the inner circle or the outer circle of the concentric circle or the concentric ring, 100 pixel points are evenly selected, and the distances from them to the center of the circle are calculated and averaged. The average value is taken as the radius of the inner or outer circle (the first contour radius or the second contour radius). The distance from a pixel point to the center of the circle is determine as shown in formula 6):

$$r_i = \sqrt{(C_t.x - P_\tau.x)^2 + (C_t.y - P_\tau.y)^2} \qquad 6)$$

where $P_\tau$ is a pixel point evenly selected on the inner circle or the outer circle, $\tau=1, 2, 3, \ldots, 100$, $P_\tau.x$ is the x-coordinate of the pixel point, and $P_\tau.y$ is the y-coordinate of the pixel point. After obtaining a plurality of radii of the inner circle or the outer circle, the final respective radii are determined by obtaining respective average values.

It should be understood that the inner circle may correspond to the first contour or the second contour, and the outer circle may correspond to the first contour or the second contour, but the inner and outer circles correspond to different contours, which is not limited herein. The finally determined center of the circle and radius of the inner circle or the outer circle may be used as parameter information of the corresponding concentric circle or concentric ring, and the fitted concentric circles and/or concentric rings and respective parameter information may be outputted as the detection result.

Figure 5:
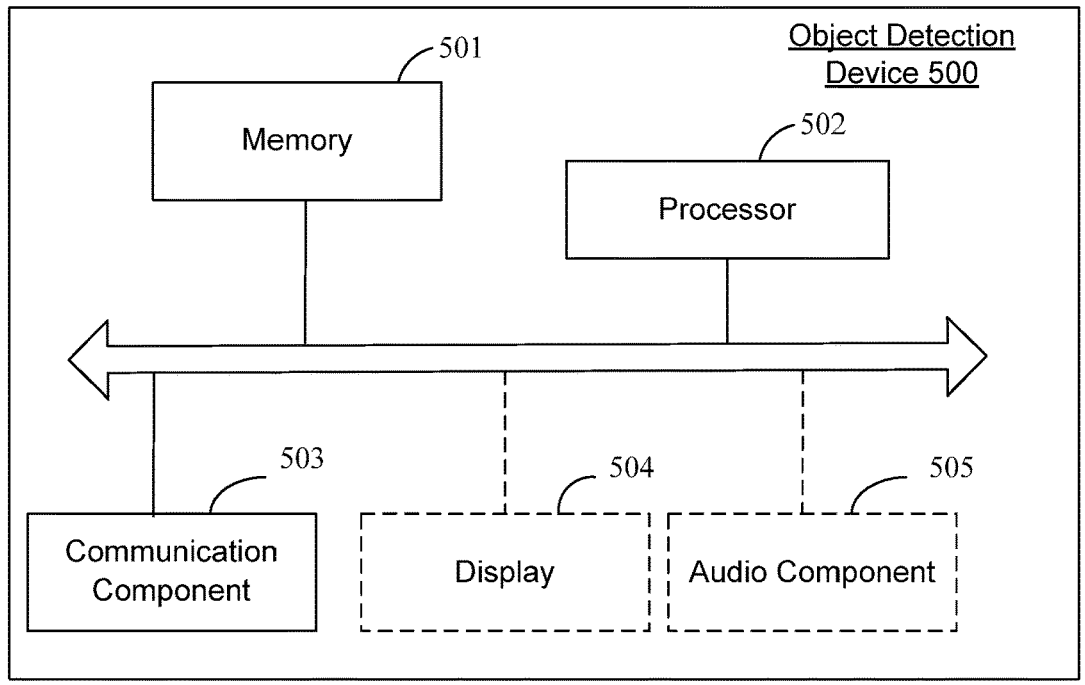
FIG. 5 is a schematic block diagram of the structure of an object detection device according to an exemplary embodiment of the present disclosure.

FIG. 5 is a schematic block diagram of the structure of an object detection device. The object detection device 500 may comprise a memory 501 and a processor 502.

The memory 501 is for storing a computer program and may be configured to store other various types of data to support the operation of the device on which it is located. Examples of such data include instructions for any application, OS or method operating on the device, and the like. The memory can be implemented by any type of volatile or non-volatile memory device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, an optical disk or an SSD.

The processor 502 is for executing the computer program, and is for: performing edge detection on an image to be detected, and determining at least one contour existing in the image to be detected; with respect to each contour, acquiring a circumscribed rectangular frame of the contour; calculating a contour diameter of an enclosed area enclosed by the contour; determining a shape of the contour based on side lengths of the circumscribed rectangular frame and the contour diameter; and determining an object in the image to be detected and parameter information of the object based on the shape of each contour.

In some examples, the processor 502 is specifically for calculating a contour area of the enclosed area enclosed by the contour based on the quantity and size of pixel points included in the enclosed area; and calculating the contour diameter of the enclosed area enclosed by the contour according to the contour area and based on a relationship between a circle's area and diameter.

In some examples, the processor 502 is specifically for judging whether a first length difference between adjacent side lengths of the circumscribed rectangular frame of the contour is within a first threshold and whether a second length difference between the contour diameter and the side length of the circumscribed rectangular frame corresponding to the contour is within a second threshold, and if the judgment results are both positive, determining that the shape of the contour is a circle.

In some examples, the processor 502 is specifically for determining that at least a first contour and a second contour exist in the image to be detected; and the processor 502 is further for acquiring a position of a first centroid of the first contour and a position of a second centroid of the second contour; and determining an object in the image to be detected and parameter information of the object based on the position of the first centroid, the position of the second centroid and a contour diameter corresponding to each contour.

In some examples, the processor 502 is specifically for, when a difference between the position of the first centroid and the position of the second centroid is less than a third threshold and a difference between a radius of the first contour and a radius of the second contour is greater than a fourth threshold, determining that the object in the image to be detected and parameter information of the object include a concentric ring; and when a difference between the position of the first centroid and the position of the second centroid is less than a third threshold and a difference between a radius of the first contour and a radius of the second contour is less than a fifth threshold, determining that the object in the image to be detected and parameter information of the object include a concentric circle.

In some examples, the processor 502 is specifically for
calculating an average value of the position of the first centroid and the position of the second centroid of the concentric ring to obtain a center of the concentric ring; and
calculating a first contour radius of the concentric ring according to a distance between a pixel point on the first contour of the concentric ring and the center of the concentric ring, and calculating a second contour radius of the concentric ring according to a distance between a pixel point on the second contour of the concentric ring and the center of the concentric ring;
and/or
calculating an average value of the position of the first centroid and the position of the second centroid of the concentric circle to obtain a center of the concentric circle; and
calculating a contour radius of the concentric circle according to distances between pixel points on the first contour and the second contour of the concentric circle and the center of the concentric circle.

In some examples, the processor 502 is specifically for taking an average value of distances between a plurality of pixel points on the first contour and the center of the concentric ring as the first contour radius of the concentric ring; and taking an average value of distances between a plurality of pixel points on the second contour and the center of the concentric ring as the second contour radius of the concentric ring; or
   taking an average value of distances between a plurality
      of pixel points on the first contour and the second
      contour of the concentric circle and the center of the
      concentric circle as the contour radius of the concentric
      circle.

In some examples, before performing edge detection on the image to be detected, the processor 502 is further for, collecting a first image of the object to be detected; performing grayscale processing on the first image; and performing Gaussian blur on the first image after grayscale processing to obtain a binarized image to be detected.

In some examples, the processor 502 is specifically for, with respect to any contour of the at least one contour, determining a vertical boundary of the contour based on boundary pixel points of the contour, and determining a circumscribed rectangular frame of the contour according to the vertical boundary. The processor 502 is further for, with respect to any contour of the at least one contour, determining a contour moment of the contour; and determining a centroid of the contour according to the contour moment of the contour.

In some examples, the processor 502 is specifically for removing a contour having a contour diameter less than a sixth threshold from the at least one contour; and/or removing a contour having a non-circular contour shape from the at least one contour.

Optionally, as to the form of the device, the object detection device according to the present embodiment may be a terminal device or a server.

Further, as shown in FIG. 5, the object detection device may further comprise: a communication component 503, a display 504, an audio component 505, a power component, and the like. Only some of the components are schematically illustrated in FIG. 5, which does not mean that the device only comprises the components shown in FIG. 5. In addition, the components shown by the dotted boxes in FIG. 5 are optional rather than necessary.

The object detection device 500 can automatically and quickly realize the function of detecting the shape of the object, reduce labor cost and time of the detection as well as the detection error caused by other detecting methods, and the complexity of the detecting process is lower.

The communication component in the above embodiments is configured to facilitate wired or wireless communication between the device in which it is located and other devices. Smart speakers can be connected to wireless networks based on a communication standard such as WiFi, 2G or 3G, or a combination thereof. In an exemplary embodiment, the communication component receives a broadcast signal or broadcast associated information from an external broadcast management system via a broadcast channel. In an exemplary embodiment, the communication component can support a near field communication (NFC) technology, a radio frequency identification (RFID) technology, an infrared data association (IrDA) technology, an ultra-bandwidth (UWB) technology, a Bluetooth (BT) technology, and other technologies.

The display in the above embodiment includes a screen, the screen may include a liquid crystal display (LCD) and a touch panel (TP). If the screen includes a touch panel, the screen can be implemented as a touch screen to receive input signals from the user. The touch panel includes one or more touch sensors to sense touches, slides, and gestures on the touch panel. The touch sensor may sense not only the boundary of the touch or slide action, but also the duration and pressure associated with the touch or slide action.

The power supply component in the above embodiment provides power to various components of the device in which the power supply component is located. The power components may include a power management system, one or more power sources, and other components associated with the generation, management, and power distribution in the device in which the power supply component is located.

The audio component of the above embodiment may be configured to output and/or input an audio signal. For example, the audio component includes a microphone (MIC) configured to receive an external audio signal when the device in which the audio component is located is in an operational mode, such as a call mode, a recording mode, and a voice recognition mode. The received audio signal may be further stored in a memory or transmitted via a communication component. In some embodiments, the audio component further includes a speaker for outputting an audio signal.

In addition, the present disclosure provides a computer storage medium, when executed by one or more processors, the computer program causes the one or more processors to implement the steps in the foregoing method embodiments.

In addition, some of the processes described in the above embodiments and the accompanying drawings include a plurality of operations occurring in a specific order, but it should be clearly understood that the operations may not be performed in the order in which they are presented or executed in parallel. The serial numbers of the operation, such as 101, 102, 103, etc., are only used to distinguish the different operations, and the serial number itself does not represent any execution order. Additionally, these processes may include more or fewer operations, and these operations may be performed sequentially or in parallel. It should be noted that the descriptions of "first" and "second" herein are used to distinguish different messages, devices, components, etc., and do not represent the sequential order or define a different type.

The device embodiments described above are merely illustrative. The units described above as separate components may be, or may not be, physically separated. The component shown as a unit may be, or may not be, a physical unit; they may be located in one place, or may be situated on a plurality of network units. It is possible to select part or all of the units according to actual needs to achieve the aim of the solution of the embodiments. Those of ordinary skill in the art can understand and implement them without paying any creative effort.

Through the description of the above embodiments, those skilled in the art can clearly understand that the embodiments can be implemented by adding a necessary general hardware platform, and can also be implemented by a combination of hardware and software. Based on such an understanding, the substance or the part that contributes to the prior art of the above technical solutions may be reflected in the form of a computer product. The present disclosure may take the form of a computer program product embodied on one or more computer-usable storage media (including but not limited to magnetic storage media, CD-ROMs, optical storage media, etc.) having computer-usable program codes recorded thereon.

The present disclosure is described with reference to flowchart illustrations and/or block diagrams of methods, apparatus (systems) and computer program products according to embodiments of the present disclosure. It should be understood that each block of the flowcharts and/or block diagrams, and combinations of blocks in the flowcharts and/or block diagrams, can be implemented by computer program instructions. These computer program instructions may be provided to a processor of a general purpose computer, special purpose computer, embedded processing apparatus, or other programmable data processing apparatus to produce a machine, such that the instructions, which execute via the processor of the computer or other programmable data processing apparatus, create means for implementing the functions specified in a block or blocks in the flowcharts and/or block diagrams.

These computer program instructions may also be stored in a computer readable memory that can direct a computer or other programmable multimedia data processing device to operate in a particular manner, such that the instructions stored in the computer readable memory produce an article of manufacture comprising the instruction device. The instruction device implements the functions specified in a block or blocks in the flowcharts and/or block diagrams.

These computer program instructions may also be loaded onto a computer or other programmable multimedia data processing device to cause a series of operational steps to be performed on the computer or other programmable apparatus to produce a computer-implemented process, such that the instructions which execute on the computer or other programmable apparatus provide steps for implementing the functions specified in a block or blocks in the flowcharts and/or block diagrams.

In a typical configuration, a computing device includes one or more processors (CPUs), input/output interfaces, network interfaces, and memories.

The memory may include non-persistent memory, random access memory (RAM), and/or non-volatile memory in a computer readable medium, such as read only memory (ROM) or flash memory. Memory is an example of a computer readable medium.

Computer readable media includes permanent or non-persistent, removable or non-removable media. Information storage can be implemented by any method or technology. The information can be computer readable instructions, data structures, program modules, or other data. Examples of computer storage media include, but are not limited to, phase change memory (PRAM), static random access memory (SRAM), dynamic random access memory (DRAM), other types of random access memory (RAM), read only memory (ROM), electrically erasable programmable read only memory (EEPROM), flash memory or other memory technology, compact disk read only memory (CD-ROM), digital versatile disk (DVD) or other optical storage, magnetic tape cartridges, magnetic tape, magnetic disk or other magnetic storage devices or any other non-transportable media that can be used to store information that can be accessed by a computing device. As defined herein, computer readable media does not include transitory computer readable media, such as modulated data signals and carrier waves.

It should be noted that the above embodiments are only used to illustrate rather than limit the technical solutions of the present disclosure. Although the present disclosure has been described in detail with reference to the foregoing embodiments, those skilled in the art should understand that they may make modifications on the technical solutions described in the foregoing embodiments or make equivalent substitutions on some technical features thereof, and these modifications or substitutions will not make the corresponding technical solutions depart from the spirit and scope of the embodiments of the present disclosure.

What is claimed is:

1. An object detection method, comprising:
    performing edge detection on an image to be detected, and determining at least one contour existing in the image to be detected;
    with respect to each contour, acquiring a circumscribed rectangular frame of the contour;
    calculating a contour diameter of an enclosed area enclosed by the contour;
    determining a shape of the contour based on side lengths of the circumscribed rectangular frame and the contour diameter;
    determining an object in the image to be detected and parameter information of the object based on the shape of each contour; and
    wherein determining the shape of the contour based on side lengths of the circumscribed rectangular frame and the contour diameter comprises:
    judging a first length difference between adjacent side lengths of the circumscribed rectangular frame of the contour and a second length difference between the contour diameter and the side length of the circumscribed rectangular frame corresponding to the contour, determining the shape of the contour according to the first length difference and the second length difference.

2. The method according to claim 1, wherein calculating the contour diameter of the enclosed area enclosed by the contour comprises:
    calculating a contour area of the enclosed area enclosed by the contour based on a quantity and a size of pixel points included in the enclosed area; and
    calculating the contour diameter of the enclosed area enclosed by the contour according to the contour area and based on a relationship between a circle's area and diameter.

3. The method according to claim 1, wherein determining the shape of the contour based on side lengths of the circumscribed rectangular frame and the contour diameter comprises:
    judging whether the first length is within a first threshold and whether the second length is within a second threshold, and if judgment results are both positive, determining that the shape of the contour is a circle.

4. The method according to claim 1, wherein
    determining at least one contour existing in the image to be detected comprises:
    determining that at least a first contour and a second contour exist in the image to be detected;
    the method further comprises:
    acquiring a position of a first centroid of the first contour and a position of a second centroid of the second contour; and
    determining an object in the image to be detected and parameter information of the object based on the position of the first centroid, the position of the second centroid and a contour diameter corresponding to each contour.

5. The method according to claim 4, wherein
    when a difference between the position of the first centroid and the position of the second centroid is less than a third threshold and a difference between a radius of the first contour and a radius of the second contour is greater than a fourth threshold, determining that the object in the image to be detected and parameter information of the object include a concentric ring;
    when a difference between the position of the first centroid and the position of the second centroid is less than the third threshold and a difference between a radius of the first contour and a radius of the second contour is less than a fifth threshold, determining that the object in the image to be detected and parameter information of the object include a concentric circle.

6. The method according to claim 5, wherein the method further comprises:
    calculating an average value of the position of the first centroid and the position of the second centroid of the concentric ring to obtain a center of the concentric ring; and
    calculating a first contour radius of the concentric ring according to a distance between a pixel point on the first contour of the concentric ring and the center of the concentric ring, and calculating a second contour radius of the concentric ring according to a distance between a pixel point on the second contour of the concentric ring and the center of the concentric ring; and/or calculating an average value of the position of the first centroid and the position of the second centroid of the concentric circle to obtain a center of the concentric circle; and calculating a contour radius of the concentric circle according to distances between pixel points on the first contour and the second contour of the concentric circle and the center of the concentric circle.

7. The method according to claim 6, wherein calculating a first contour radius of the concentric ring according to a distance between a pixel point on the first contour of the concentric ring and the center of the concentric ring, and calculating a second contour radius of the concentric ring according to a distance between a pixel point on the second contour of the concentric ring and the center of the concentric ring comprises:

taking an average value of distances between a plurality of pixel points on the first contour and the center of the concentric ring as the first contour radius of the concentric ring; and taking an average value of distances between a plurality of pixel points on the second contour and the center of the concentric ring as the second contour radius of the concentric ring;

calculating a contour radius of the concentric circle according to distances between pixel points on the first contour and the second contour of the concentric circle and the center of the concentric circle comprises:

taking an average value of distances between a plurality of pixel points on the first contour and the second contour of the concentric circle and the center of the concentric circle as the contour radius of the concentric circle.

8. The method according to claim 1, wherein before performing edge detection on the image to be detected, the method further comprises:

collecting a first image of the object to be detected;
performing grayscale processing on the first image; and
performing Gaussian blur on the first image after grayscale processing to obtain a binarized image to be detected.

9. The method according to claim 1, wherein acquiring a circumscribed rectangular frame of the contour comprises:

with respect to any contour of the at least one contour, determining a vertical boundary of the contour based on boundary pixel points of the contour, and determining a circumscribed rectangular frame of the contour according to the vertical boundary;

the method further comprises:

with respect to any contour of the at least one contour, determining a contour moment of the contour; and
determining a centroid of the contour according to the contour moment of the contour.

10. The method according to claim 1, wherein the method further comprises:

removing a contour having a contour diameter less than a sixth threshold from the at least one contour;
and/or
removing a contour having a non-circular contour shape from the at least one contour.

11. An object detection device, comprising:
a memory for storing a computer program; and
a processor for executing the computer program;

wherein the processor is for performing edge detection on an image to be detected, and determining at least one contour existing in the image to be detected;

with respect to each contour, acquiring a circumscribed rectangular frame of the contour;

calculating a contour diameter of an enclosed area enclosed by the contour;

determining a shape of the contour based on side lengths of the circumscribed rectangular frame and the contour diameter;

determining an object in the image to be detected and parameter information of the object based on the shape of each contour; and wherein the processor is specifically for judging a first length difference between adjacent side lengths of the circumscribed rectangular frame of the contour and a second length difference between the contour diameter and the side length of the circumscribed rectangular frame corresponding to the contour, and determining the shape of the contour according to the first length difference and the second length difference.

12. The device according to claim 11, wherein the processor is specifically for calculating a contour area of the enclosed area enclosed by the contour based on a quantity and a size of pixel points included in the enclosed area; and calculating the contour diameter of the enclosed area enclosed by the contour according to the contour area and based on a relationship between a circle's area and diameter.

13. The device according to claim 11, wherein the processor is specifically for judging whether the first length is within a first threshold and whether the second length is within a second threshold, and if judgment results are both positive, determining that the shape of the contour is a circle.

14. The device according to claim 11, wherein the processor is specifically for determining that at least a first contour and a second contour exist in the image to be detected; and the processor is further for acquiring a position of a first centroid of the first contour and a position of a second centroid of the second contour; and determining an object in the image to be detected and parameter information of the object based on the position of the first centroid, the position of the second centroid and a contour diameter corresponding to each contour.

15. The device according to claim 14, wherein the processor is specifically for when a difference between the position of the first centroid and the position of the second centroid is less than a third threshold and a difference between a radius of the first contour and a radius of the second contour is greater than a fourth threshold, determining that the object in the image to be detected and parameter information of the object include a concentric ring; and when a difference between the position of the first centroid and the position of the second centroid is less than the third threshold and a difference between a radius of the first contour and a radius of the second contour is less than a fifth threshold, determining that the object in the image to be detected and parameter information of the object include a concentric circle.

16. The device according to claim 15, wherein the processor is specifically for calculating an average value of the position of the first centroid and the position of the second centroid of the concentric ring to obtain a center of the concentric ring; and calculating a first contour radius of the concentric ring according to a distance between a pixel point on the first contour of the concentric ring and the center of the concentric ring, and calculating a second contour radius of the concentric ring according to a distance between a pixel point on the second contour of the concentric ring and the center of the concentric ring;

and/or calculating an average value of the position of the first centroid and the position of the second centroid of the concentric circle to obtain a center of the concentric circle; and calculating a contour radius of the concentric circle according to distances between pixel points on the first contour and the second contour of the concentric circle and the center of the concentric circle.

17. The device according to claim 16, wherein the processor is specifically for taking an average value of distances between a plurality of pixel points on the first contour and the center of the concentric ring as the first contour radius of the concentric ring; and taking an average value of distances between a plurality of pixel points on the second contour and the center of the concentric ring as the second contour radius of the concentric ring;

or taking an average value of distances between a plurality of pixel points on the first contour and the second contour of the concentric circle and the center of the concentric circle as the contour radius of the concentric circle.

18. The device according to claim 11, wherein the processor is specifically for, with respect to any contour of the at least one contour, determining a vertical boundary of the contour based on boundary pixel points of the contour, and determining a circumscribed rectangular frame of the contour according to the vertical boundary; and the processor is further for with respect to any contour of the at least one contour, determining a contour moment of the contour; and determining a centroid of the contour according to the contour moment of the contour.

19. The device according to claim 11, wherein the processor is specifically for removing a contour having a contour diameter less than a sixth threshold from the at least one contour;

and/or removing a contour having a non-circular contour shape from the at least one contour.

20. A non-transitory computer readable storage medium storing a computer program, wherein when executed by one or more processors, the computer program causes the one or more processors to implement steps of a method comprising performing edge detection on an image to be detected, and determining at least one contour existing in the image to be detected;

with respect to each contour, acquiring a circumscribed rectangular frame of the contour;

calculating a contour diameter of an enclosed area enclosed by the contour;

determining a shape of the contour based on side lengths of the circumscribed rectangular frame and the contour diameter; and determining an object in the image to be detected and parameter information of the object based on the shape of each contour;

wherein determining the shape of the contour based on side lengths of the circumscribed rectangular frame and the contour diameter comprises:

judging whether a first length difference between adjacent side lengths of the circumscribed rectangular frame of the contour is within a first threshold and whether a second length difference between the contour diameter and the side length of the circumscribed rectangular frame corresponding to the contour is within a second threshold, and if judgment results are both positive, determining that the shape of the contour is a circle.

* * * * *